(12) United States Patent
Anderson et al.

(10) Patent No.: US 11,859,523 B2
(45) Date of Patent: Jan. 2, 2024

(54) MUFFLER

(71) Applicant: HONEYWELL INTERNATIONAL INC., Charlotte, NC (US)

(72) Inventors: Morris G. Anderson, Phoenix, AZ (US); Swarna Sinha, Phoenix, AZ (US); Daniel Brown, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 23 days.

(21) Appl. No.: 17/647,192

(22) Filed: Jan. 6, 2022

(65) Prior Publication Data
US 2023/0212967 A1  Jul. 6, 2023

(51) Int. Cl.
*F01N 1/08* (2006.01)
*F01N 1/00* (2006.01)

(52) U.S. Cl.
CPC ............. *F01N 1/083* (2013.01); *F01N 1/006* (2013.01)

(58) Field of Classification Search
CPC ......... F01N 1/083; F01N 1/12; F01N 2470/24
See application file for complete search history.

(56) References Cited

U.S. PATENT DOCUMENTS

| 1,598,578 | A | * | 8/1926 | Maxim | ............... | F01N 13/1894 |
| | | | | | | 181/265 |
| 2,838,128 | A | | 6/1958 | Kliewer, Sr. | | |
| 4,913,597 | A | * | 4/1990 | Christianson | .......... | B65G 53/24 |
| | | | | | | 406/173 |
| 7,367,424 | B2 | | 5/2008 | Brown et al. | | |
| 10,954,834 | B2 | | 3/2021 | Shin et al. | | |
| 2004/0245044 | A1 | * | 12/2004 | Cerrato-Jay | ............ | F01N 1/083 |
| | | | | | | 181/269 |
| 2007/0039316 | A1 | * | 2/2007 | Bosanec, Jr. | ........... | F01N 1/083 |
| | | | | | | 60/309 |
| 2016/0376952 | A1 | | 12/2016 | Sula | | |
| 2019/0024548 | A1 | | 1/2019 | Karay et al. | | |

(Continued)

FOREIGN PATENT DOCUMENTS

FR       1116925 A    5/1956
GB        158444 A    2/1921
(Continued)

OTHER PUBLICATIONS

Machine translation of KR-200178295-Y1; accessed Mar. 23, 2023 (Year: 2023).*

*Primary Examiner* — Jonathan R Matthias
(74) *Attorney, Agent, or Firm* — LORENZ & KOPF, LLP

(57) ABSTRACT

A muffler includes a housing defining a first chamber, a second chamber and a third chamber. The muffler includes at least a pair of nested protrusions in communication with an inlet. The pair of nested protrusions is coupled to a respective surface of a pair of plates disposed in the housing such that one of the pair of nested protrusions is spaced apart from and opposite another of the pair of nested protrusions to define a tortuous path that terminates at an outlet defined along an outer circumference. The first chamber is downstream from the pair of plates. The muffler includes a first tube fluidly coupled to the first chamber to direct the exhaust gases from the first chamber to the second chamber. The muffler includes a second tube fluidly coupled to the second chamber to direct the exhaust gases from the second chamber to the third chamber.

19 Claims, 12 Drawing Sheets

(56) References Cited

U.S. PATENT DOCUMENTS

| | | |
|---|---|---|
| 2019/0308741 A1 | 10/2019 | Dittmar et al. |
| 2021/0180502 A1 | 6/2021 | Chana et al. |
| 2021/0270388 A1 | 9/2021 | Pearson et al. |

FOREIGN PATENT DOCUMENTS

| | | | |
|---|---|---|---|
| KR | 200178295 Y1 | * | 4/2000 |
| KR | 100403277 B1 | | 10/2003 |
| WO | 2013078927 A1 | | 6/2013 |

* cited by examiner

MUFFLER

TECHNICAL FIELD

The present disclosure generally relates to a muffler, and more particularly relates to a muffler for an engine associated with a power unit, such as an auxiliary power unit or micro power unit.

BACKGROUND

Engines may be employed to propel or power various devices. For example, a gas turbine engine may be employed to propel a vehicle, such as an aircraft. In the example of the vehicle as an aircraft, the aircraft may also have an additional power unit, such as an auxiliary power unit, to supply power to other components associated with the aircraft and to supply power while the aircraft is on the ground, for example. In addition, in the example of the vehicle as a small size aircraft, such as business jets, these aircraft may employ a micro power unit to supply power to other components of the aircraft and to supply power while the aircraft is on the ground. Micro power units may also be employed by ground based vehicles, to supply power to additional components associated with the ground based vehicles. The operation of the auxiliary power unit and the micro power unit to supply power on the ground, however, may result in noise, which is undesirable for passengers and crew onboard the vehicle, and for service personnel outside.

Accordingly, it is desirable to provide a muffler for use with an engine, such as an engine associated with an auxiliary power unit or micro power unit, for reducing the noise experienced by passengers, crew, and service personnel, for example, during the operation of the auxiliary power unit or micro power unit. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is a muffler. The muffler includes a housing defining a first chamber, a second chamber and a third chamber. The first chamber is positioned opposite the third chamber within the housing, and the housing is fluidly coupled to a source of exhaust gases via an inlet. The muffler includes at least a pair of nested protrusions in communication with the inlet and configured to receive the exhaust gases. The pair of nested protrusions is coupled to a respective surface of a pair of plates disposed in the housing such that one of the pair of nested protrusions is spaced apart from and opposite another of the pair of nested protrusions to define a tortuous path for the exhaust gases that terminates at an outlet defined along an outer circumference of one of the pair of plates. The first chamber is downstream from the pair of plates and in fluid communication with the outlet. The muffler includes a first tube fluidly coupled between the first chamber and the second chamber that is configured to direct the exhaust gases from the first chamber to the second chamber. The muffler includes a second tube fluidly coupled between the second chamber and the third chamber that is configured to direct the exhaust gases from the second chamber to the third chamber.

The first chamber includes a perforated tube disposed axially within the first chamber. The perforated tube is fluidly coupled to the first tube and configured to direct the exhaust gases from the first chamber to the first tube. The muffler has a longitudinal axis, the pair of plates extend along the longitudinal axis, the first tube extends along an axis substantially parallel to the longitudinal axis and the perforated tube extends along a centerline substantially perpendicular to the longitudinal axis. The second chamber is disposed about the pair of plates proximate the outlet and fluidly isolated from the outlet. The muffler includes a third tube disposed in the third chamber and configured to direct the exhaust gases from the third chamber to exit the muffler. The pair of nested protrusions have a polygonal shape. The source of exhaust gases is a header pipe associated with an engine of a power unit. The pair of plates includes a first plate opposite and spaced apart from a second plate, the first plate including a first surface opposite a second surface, the second plate including a third surface opposite a fourth surface, and the pair of nested protrusions include a first pair of nested protrusions defined on the first surface of the first plate and a second pair of nested protrusions defined on the third surface of the second plate, the first pair of nested protrusions facing the second pair of nested protrusions to define the tortuous path. The first pair of nested protrusions is offset from the second pair of nested protrusions to define the tortuous path. The muffler includes a deswirl assembly coupled about a perimeter of the housing. The housing further comprises a first housing wall, a second housing wall coupled to the first housing wall and a third housing wall, the deswirl assembly coupled to the second housing wall, and the second chamber is defined between the first housing wall, the second housing wall and the first chamber. The third chamber is defined between one of the pair of plates and the third housing wall. The pair of nested protrusions include concentric circular protrusions. The second tube is defined in a sub-housing, and the sub-housing is coupled to one of the pair of plates.

Also provided is a muffler for an engine. The muffler includes a housing defining a first chamber, a second chamber and a third chamber. The first chamber is positioned opposite the third chamber within the housing, the second chamber is radially outboard of the first chamber, and the housing is configured to be fluidly coupled to the engine and is configured to receive exhaust gases from the engine via an inlet. The muffler includes a pressure attenuator including a first plate and a second plate in communication with the inlet and configured to receive the exhaust gases. The first plate and the second plate cooperate to define a tortuous path that extends radially from the inlet. The first plate includes a first pair of nested protrusions offset from a second pair of nested protrusions of the second plate. The pressure attenuator is upstream from the first chamber and the first chamber is fluidly coupled to the pressure attenuator via an outlet defined at an outer perimeter of the first plate. The muffler includes a first tube fluidly coupled between the first chamber and the second chamber configured to direct the exhaust gases from the first chamber to the second chamber. The muffler includes a second tube fluidly coupled between the second chamber and the third chamber configured to direct the exhaust gases from the second chamber to the third chamber.

The first chamber includes a perforated tube disposed axially within the first chamber and the perforated tube is fluidly coupled to the first tube and configured to direct the exhaust gases from the first chamber to the first tube. The muffler has a longitudinal axis, the first plate and the second plate extend along the longitudinal axis, the first tube extends along an axis substantially parallel to the longitudinal axis and the perforated tube extends along a centerline substantially perpendicular to the longitudinal axis. The muffler includes a deswirl assembly coupled about a perimeter of the housing and the housing further comprises a first housing wall, a second housing wall coupled to the first housing wall and a third housing wall, the deswirl assembly coupled to the second housing wall, and the second chamber is defined between the first housing wall, the second housing wall and the first chamber. The muffler includes a third tube disposed in the third chamber and configured to direct the exhaust gases from the third chamber to exit the muffler.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
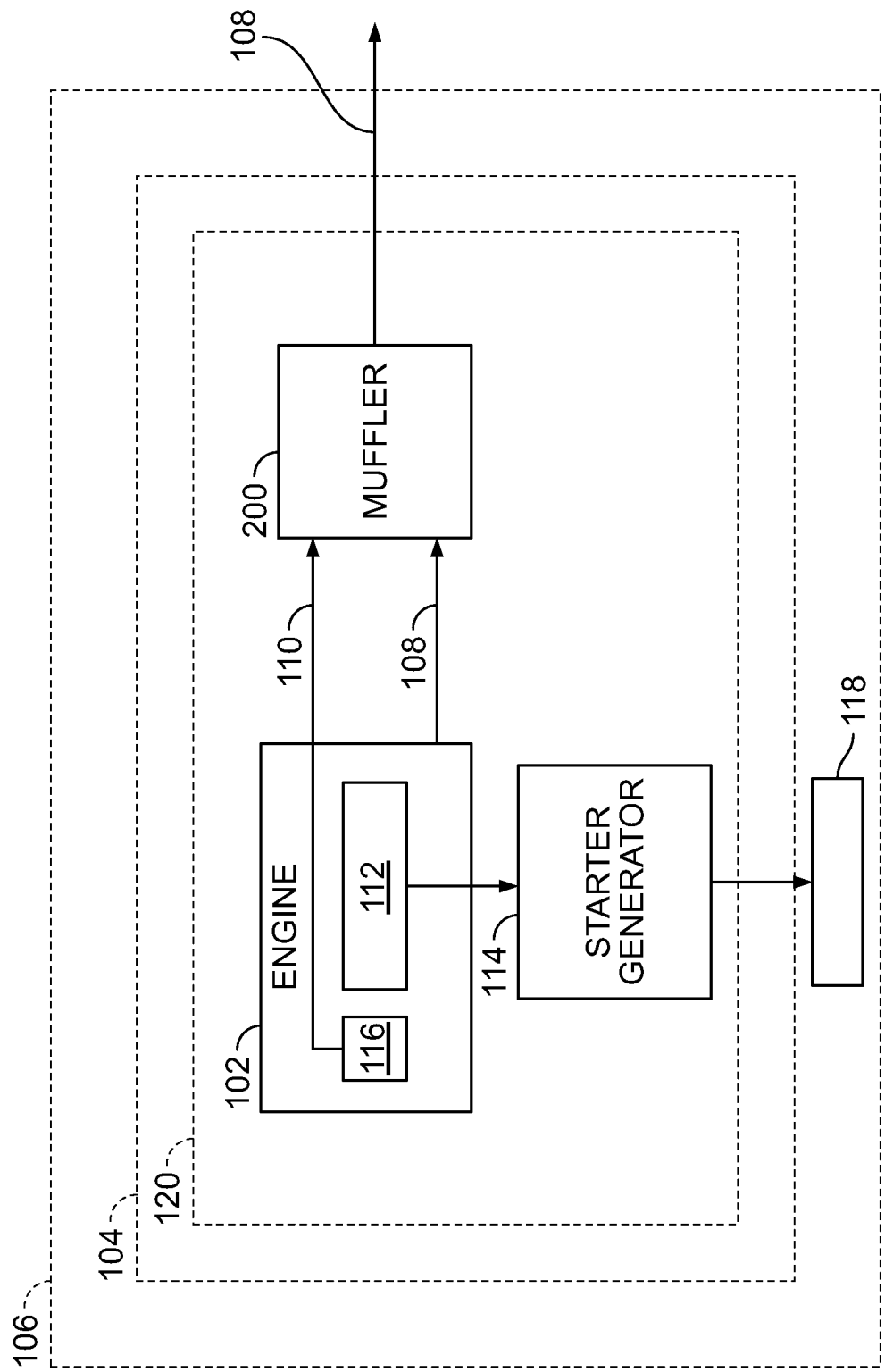
FIG. 1 is a functional block diagram of an exemplary muffler for use with an engine, such as an engine associated with a power unit in accordance with the various teachings of the present disclosure.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of device that would benefit from sound attenuation and the use of the muffler with an auxiliary power unit or a micro power unit described herein is merely one exemplary embodiment according to the present disclosure. In addition, while the muffler is described herein as being used with an auxiliary power unit or a micro power unit onboard a vehicle, such as a bus, motorcycle, train, motor vehicle, marine vessel, aircraft, rotorcraft and the like, the various teachings of the present disclosure can be used with an engine on a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

With reference to FIG. 1, a functional block diagram illustrates a muffler 200 employed with an exemplary engine 102. In this example, the engine 102 is associated with a power unit 104, which is onboard a vehicle 106. For example, the power unit 104 may be employed with various applications including aerospace (small jets and turboprops; charter companies; fractional companies; corporate fleets; and special mission aircraft). Other applications include military vehicles (e.g., M1 Tank, Joint Light Tactical Vehicle, Paladin, etc.); mobile command posts; mobile medical facilities; and emergency response. Ground based vehicle applications include tracked vehicles and artillery pieces. Military ground power equipment applications include command posts, remote power supplies, medical units, and integrated aircraft systems. Portable power systems applications include remote power generation systems and rapid deployment power systems. Thus, in other examples, the power unit 104 (including the engine 102 and the muffler 200) may be employed on a stationary platform. As will be discussed, the muffler 100 receives exhaust gases 108 from the engine 102, and attenuates the sound generated by the engine 102 to reduce the noise experienced by passengers, crew, and service personnel. In certain instances, the muffler 200 may also receive cooling fluid, such as cooling air 110, from the engine 102 or a cooling fan 116 associated with the engine 102, which may be used to cool the muffler 200. After passing through the muffler 200, the exhaust gases 108 may exit the power unit 104 and the vehicle 106, or may be directed to another secondary muffler downstream.

The engine 102 comprises any suitable engine, including, but not limited to, a gas turbine engine, an internal combustion engine, a Wankel engine, etc. As the muffler 200 may be employed with any type of engine 102 that generates the exhaust gases 108 and optionally cooling air 110, the engine 102 will not be discussed in detail herein. Briefly, in the example of the engine 102 as a Wankel engine, the engine 102 employs an eccentric rotary design to convert pressure into rotating motion. The engine 102 is configured to combust a fuel and air mixture to generate the rotary movement, which is used to generate electrical power. The fuel is any suitable combustible fuel, including, but not limited to jet fuel (unleaded kerosene or a naphtha-kerosene blend), aviation gasoline, biofuels, diesel, gasoline, and the like. In one example, the engine 102 includes one or more spark coils to generate an electric spark to ignite the fuel, and the resulting combustion drives a rotor of the engine 102. The rotor, in turn, drives an output shaft 112. One end of the output shaft 112 is coupled to a starter-generator 114 to drive the starter-generator 114 to generate electric power for the vehicle 106, and the other end of the output shaft 112 is coupled to the cooling fan 116. The cooling fan 116 provides the cooling air 110 to cool the engine 102 and the muffler 200. The electric power generated by the starter-generator 114 is provided to a consumer 118 associated with the vehicle 106, including, but not limited to a heating, ventilation and cooling system, a lighting system, a starter system, a flight instrument system, etc.

The power unit 104 comprises an auxiliary power unit or a micro power unit, which is coupled to the vehicle 106 to supply electrical power when the vehicle 106 is on the ground, for example. As the muffler 200 and the engine 102 may be associated with any type of power unit 104, the power unit 104 will not be discussed in detail herein. Briefly, in one example, the power unit 104 is a micro power unit, such as that described in commonly assigned U.S. application Ser. No. 16/367,564, filed on Mar. 28, 2019 to Dittmar et. al., and published as U.S. Publication No. 2019/0308741, the relevant portion of which is hereby incorporated by reference herein. The engine 102, the starter-generator 114, the cooling fan 116 and the muffler 200 may be contained within a housing 120 to enable the power unit 104 to be removable from the vehicle 106. Generally, as discussed, the power unit 104 includes the engine 102, which generates power to drive the starter-generator 114 to supply electric power to the consumer 118 of the vehicle 106.

Figure 2:
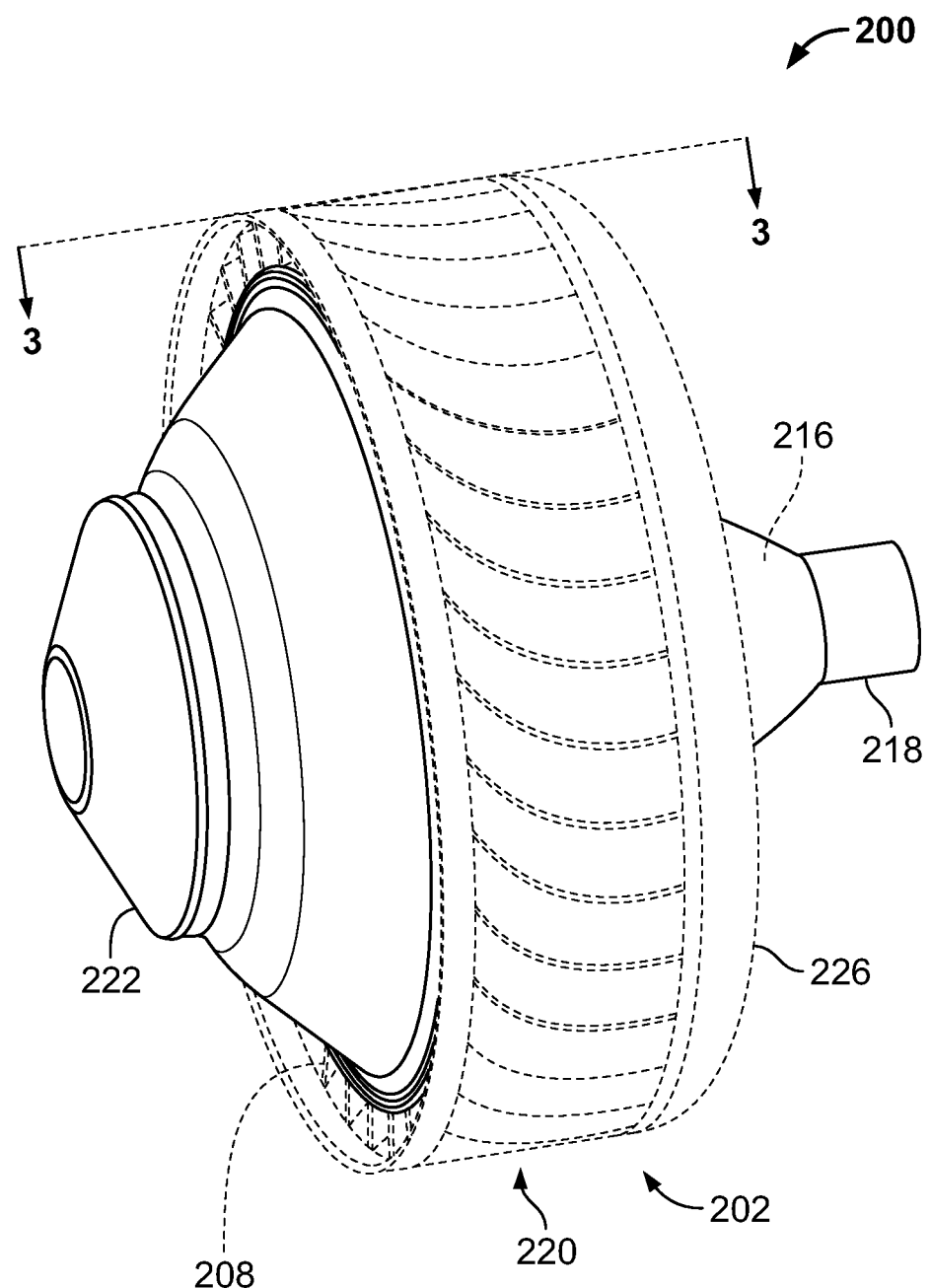
FIG. 2 is a perspective view of the muffler of FIG. 1.

As discussed, the muffler 200 is in fluid communication with the engine 102 to receive the exhaust gases 108, and optionally, is in fluid communication with the cooling fan 116 to receive the cooling air 110. With reference to FIG. 2, and additional reference to FIG. 3, the muffler 200 is shown in greater detail. In on example, the muffler 200 includes a housing 202, a header pipe 204 (FIG. 3), a pressure attenuator 206 (FIG. 3), a first, forward chamber 208, a first tube or first transfer tube 210 (FIG. 3), a second, outer chamber 212 (FIG. 3), a second tube or second transfer tube 214 (FIG. 3), a third, aft chamber 216, a third tube or exhaust pipe 218 and a deswirl assembly 220.

Figure 3:
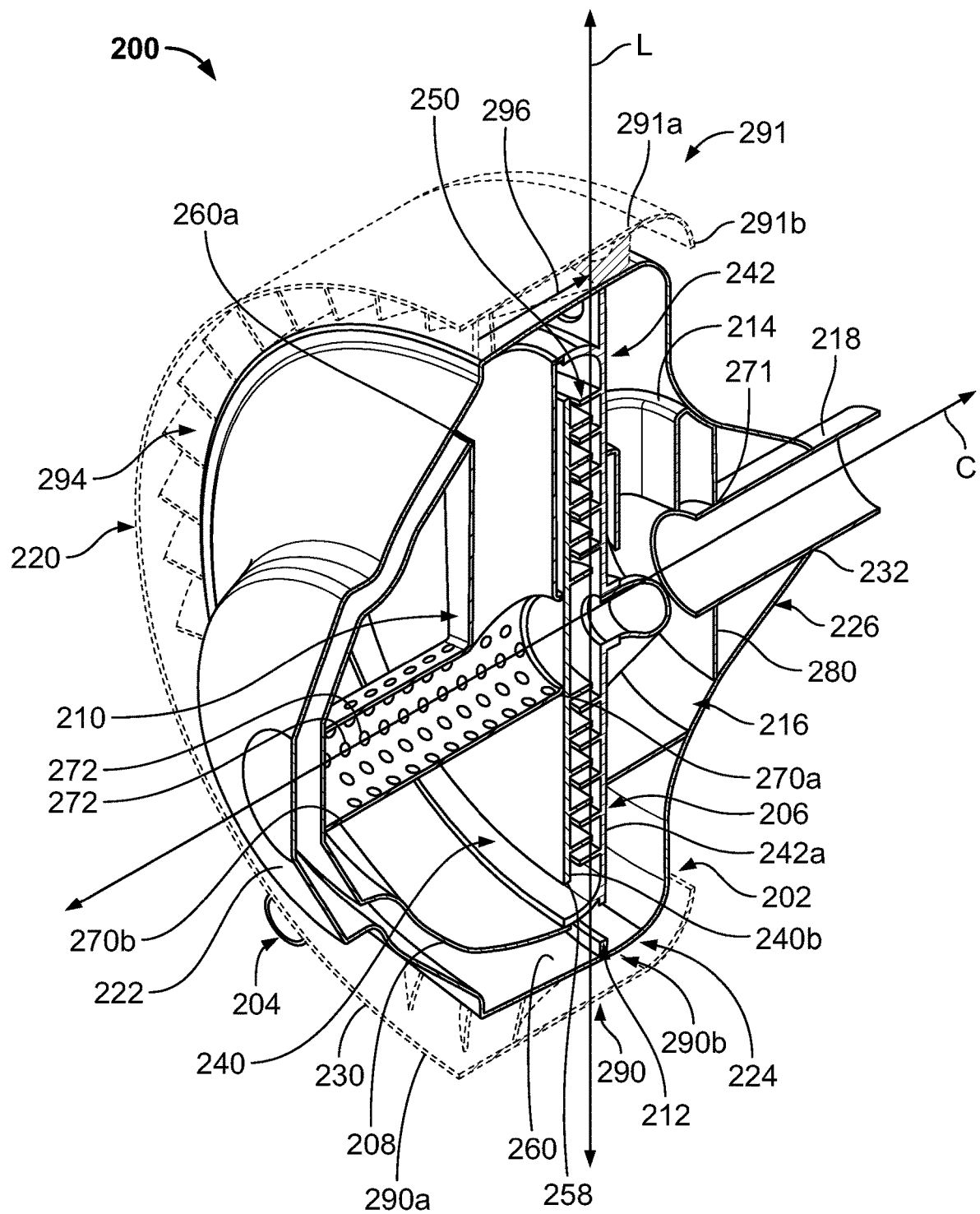
FIG. 3 is a forward elevation cross-sectional view of the muffler, taken along line 3-3 of FIG. 2.
Figure 4:
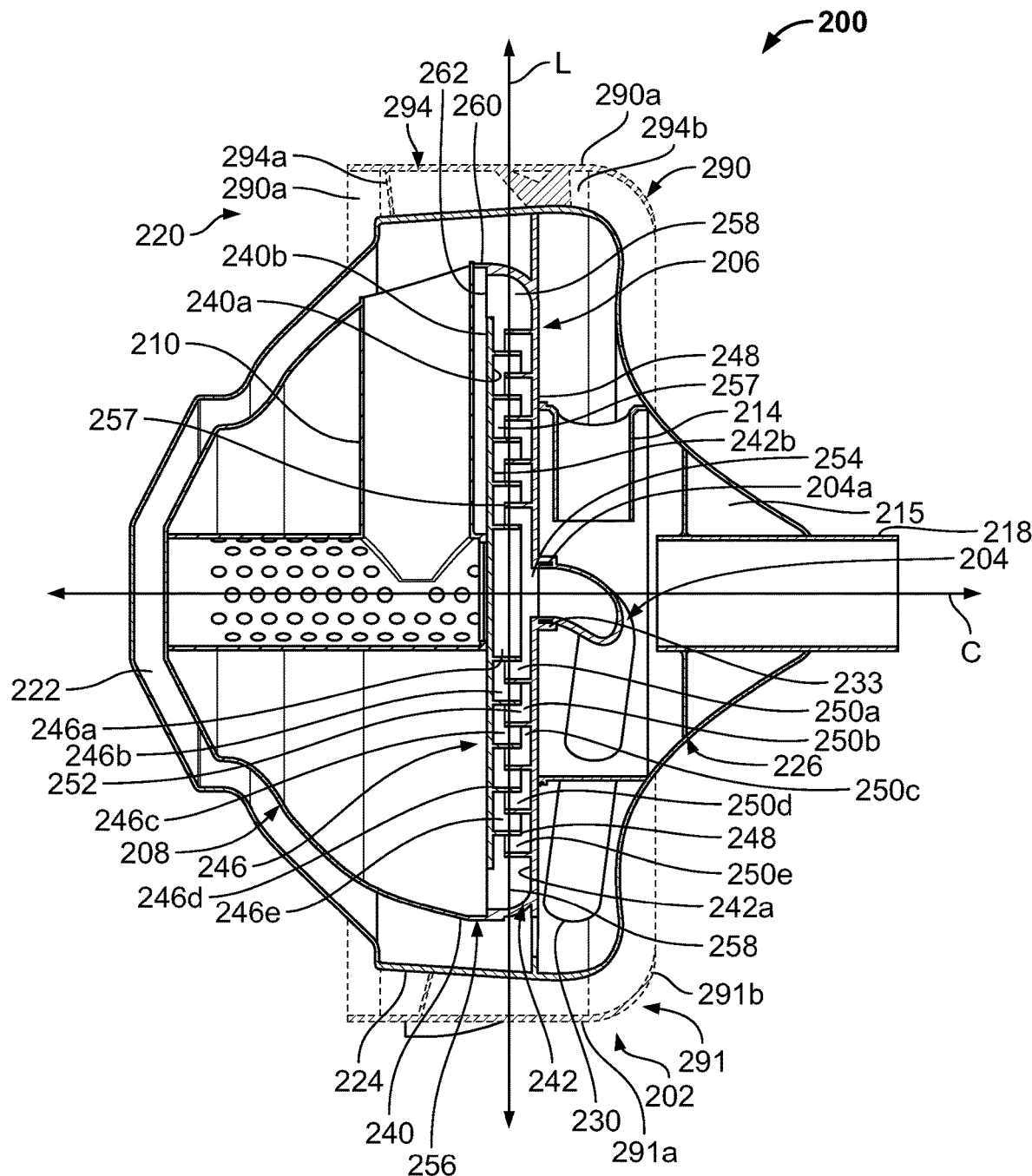
FIG. 4 is a cross-sectional view of the muffler taken along line 3-3 of FIG. 2.

With reference to FIG. 3, the housing 202 surrounds and encloses the pressure attenuator 206, the forward chamber 208, the first transfer tube 210, the outer chamber 212, the second transfer tube 214, and the aft chamber 216. The housing 202 also encloses and surrounds a portion of the header pipe 204 and the exhaust pipe 218. The housing 202 is composed of a metal or metal alloy, and may be cast, stamped, forged, or additively manufactured. In this example, the housing 202 includes a first housing wall 222, a second housing wall 224 and a third housing wall 226. The first housing wall 222 is upstream from the third housing wall 226 in a direction of fluid flow through the muffler 200. The first housing wall 222 is substantially frustoconical, however, the first housing wall 222 may have any desired shape. The second housing wall 224 is coupled to the first housing wall 222 and the third housing wall 226. The second housing wall 224 is substantially cylindrical. The second housing wall 224 also defines an intake bore 230 (FIG. 4). The intake bore 230 enables a portion of the header pipe 204 to pass into the interior of the housing 202. The third housing wall 226 is substantially conical, and defines an exhaust bore 232. The exhaust bore 232 enables a portion of the exhaust pipe 218 to pass out of the housing 202.

The header pipe 204 is fluidly coupled to the engine 102 to receive the exhaust gases 108. The header pipe 204 is received through the intake bore 230, and terminates at the pressure attenuator 206 at an end 204a. In this example, with reference to FIG. 4, the header pipe 204 bends or curves between the intake bore 230 and the end 204a to direct the exhaust gases 108 into a center of the pressure attenuator 206. In one example, the header pipe 204 extends through a sub-housing 215 associated with the second transfer tube 214. The end 204a of the pressure attenuator 206 is received and coupled to an annular flange 233, which extends axially outward from a portion of the pressure attenuator 206.

The pressure attenuator 206 extends radially within the housing 202. In one example, the pressure attenuator 206 includes two spaced apart plates, a first plate 240 and an opposed second plate 242. In this example, each of the first plate 240 and the second plate 242 are circular to comport with the shape of the second housing wall 224, however, the first plate 240 and the second plate 242 may have any desired shape, including, but not limited to, rectangular, oval, square, etc. With brief reference to FIG. 5, the first plate 240 includes at least a pair of nested protrusions, and in this example, the first plate 240 includes five first protrusions 246a-246e. With reference back to FIG. 3, in this example, the first protrusions 246a-246e are concentric to a central axis C of the first plate 240 and the second plate 242, and are substantially evenly spaced radially along a longitudinal axis L of the muffler 200. It should be noted that the first protrusions 246a-246e may be arranged in other patterns on the first plate 240 and may not be evenly spaced. Each of the first protrusions 246a-246e extend axially from a first surface 240a of the first plate 240. The first surface 240a is opposite a second surface 240b. In this example, each of the first protrusions 246a-246e are planar or extend from the first surface 240a along an axis substantially parallel to the central axis C. In other examples, the first protrusions 246a-246e may extend from the first surface 240a at an angle so as to extend along an axis oblique to the central axis C. Each of the first protrusions 246a-246e have an end coupled to the first surface 240a, and an opposite end or terminal end 248. The terminal end 248 of each of the first protrusions 246a-246e is spaced apart from a third surface 242a of the second plate 242.

Figure 6:
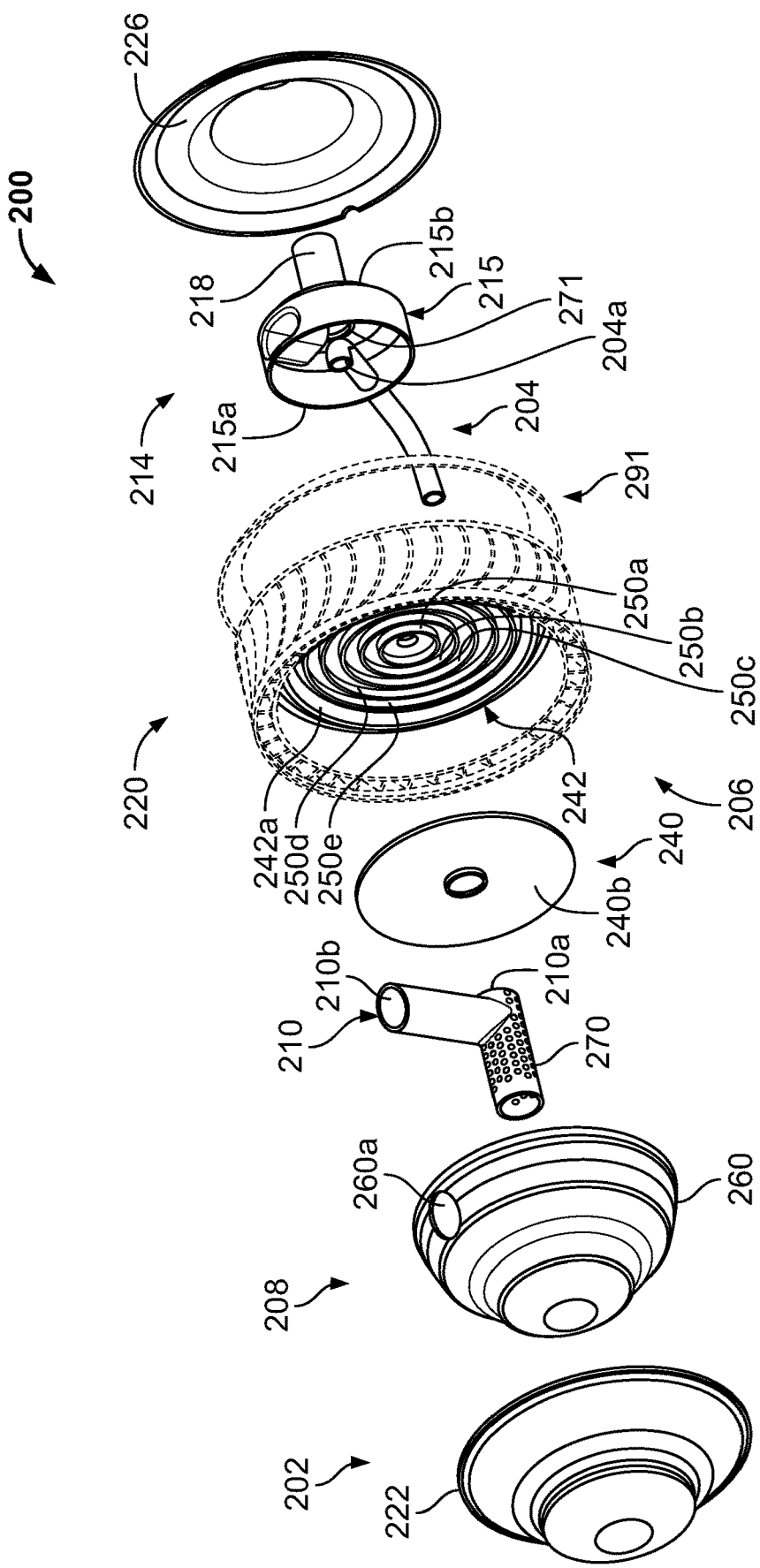
FIG. 6 is a front exploded view of the muffler.

With brief reference to FIG. 6, the second plate 242 includes at least a pair of nested protrusions, and in this example, the second plate 242 includes five second protrusions 250a-250e. With reference back to FIG. 3, in this example, the second protrusions 250a-250e are concentric to the central axis C of the first plate 240 and the second plate 242, and are substantially evenly spaced radially along the longitudinal axis L of the muffler 200. It should be noted that the second protrusions 250a-250e may be arranged in other patterns on the second plate 242 and may not be evenly spaced. Each of the second protrusions 250a-250e extend axially from the third surface 242a of the second plate 242. The third surface 242a is opposite a fourth surface 242b. In this example, each of the second protrusions 250a-250e are planar or extend from the third surface 242a along an axis substantially parallel to the central axis C. In other examples, the second protrusions 250a-250e may extend from the third surface 242a at an angle so as to extend along an axis oblique to the central axis C. Each of the second protrusions 250a-250e have an end coupled to the third surface 242a, and an opposite end or terminal end 252. The terminal end 252 of each of the second protrusions 250a-250e is spaced apart from the first surface 240a of the first plate 240. In this example, the second plate 242 defines a bore 254 that forms an inlet of the pressure attenuator 206. The bore 254 is fluidly coupled to the header pipe 204. The annular flange 233 is defined about the bore 254 and extends outwardly from the fourth surface 242b of the second plate 242. In this example, the first protrusions 246a-246e and the second protrusions 250a-250e are circular, however, it should be noted that the first protrusions 246a-246e and the second protrusions 250a-250e may have any desired shape.

In one example, with reference back to FIG. 5, the second plate 242 is coupled to and integrally formed with the second housing wall 224. In this example, a plurality of struts 253 interconnect the second plate 242 with the second housing wall 224. The struts 253 are spaced apart about the circumference of the second plate 242 and the second housing wall 224 to define a plurality of apertures 255. Each of the apertures 255 has a generally race-track shape. The apertures 255 enable the fluid to flow along the exterior of the second housing wall 224 in the outer chamber 212. The third housing wall 226 is coupled to the second housing wall 224 and is in fluid communication with the apertures 255. As will be discussed, the sub-housing 215 fluidly isolates the aft chamber 216 from the outer chamber 212.

With reference back to FIG. 3, in this example, the first protrusions 246a-246e face the second protrusions 250a-250e and are offset or misaligned from the second protrusions 250a-250e along the longitudinal axis L. By spacing the terminal end 248, 252 of the first protrusions 246a-246e and the second protrusions 250a-250e, respectively, from the corresponding one of the first surface 240a and the third surface 242a and misaligning the first protrusions 246a-246e from the second protrusions 250a-250e, an undulating tortuous path 256 for the exhaust gases 108 is defined between the first protrusions 246a-246e and the second protrusions 250a-250e along the longitudinal axis L. The tortuous path 256 extends radially from the inlet defined by the bore 254 to an outer perimeter or circumference 258 of the first plate 240. The outer circumference 258 of the first plate 240 is spaced apart from a chamber wall 260 of the forward chamber 208 and defines an outlet 262 about the outer circumference 258 for the exhaust gases 108 to enter into the forward chamber 208. The tortuous path 256 results in pressure loss for the exhaust gases 108, which has to make sharp turns to pass between gaps 257 defined between the respective terminal end 248, 252 and the respective first surface 240a and third surface 242a. The tortuous path 256 reduces pressure, and thus, velocity of incoming flow. The velocity reduction limits flow noise generation, while incoming acoustic pulses are also attenuated via viscous dissipation along the long path length out of the first plate 240 and the second plate 242.

It should be noted that while the terminal end 248, 252 is illustrated herein as being smooth, the terminal end 248, 252 of one or more of the first protrusions 246a-246e and the second protrusions 250a-250e may be serrated, scalloped, or have a different shape. In addition, while the first plate 240 and the second plate 242 are illustrated herein as extending along the longitudinal axis L over substantially an entirety of the forward chamber 208, in other embodiments, the first plate 240 and the second plate 242 may have a reduced height or length along the longitudinal axis L such that the first plate 240 and the second plate 242 extend along the longitudinal axis L for only a portion of the forward chamber 208. The first plate 240 and the second plate 242 are each composed of metal or metal alloy, and may be stamped, cast, machined, additively manufactured, etc. In one example, the first plate 240 and the second plate 242 may be stamped with grooves for the first protrusions 246a-246e and the second protrusions 250a-250e, respectively, and the first protrusions 246a-246e and the second protrusions 250a-250e may be separately formed, via stamping, for example, and fixedly coupled to the grooves of the respective first plate 240 and the second plate 242 via welding or brazing, for example. Optionally, one or more pins may be employed to couple the first plate 240 to the second plate 242 to maintain the gap 257 between the first plate 240 and the second plate 242.

It should be noted that in other embodiments, the pressure attenuator 206 for the muffler 200 may be configured differently to define the tortuous path 256 to reduce pressure and velocity of incoming airflow. For example, with reference to FIG. 7, a side view of a pressure attenuator 300 is shown. As the pressure attenuator 300 includes components that are the same or similar to components of the pressure attenuator 206 discussed with regard to FIGS. 1-6, the same reference numerals will be used to denote the same or similar components. The pressure attenuator 300 extends radially within the housing 202. It should be noted that the housing 202 may be modified, if desired, to accommodate the shape of the pressure attenuator 300.

Figure 8:
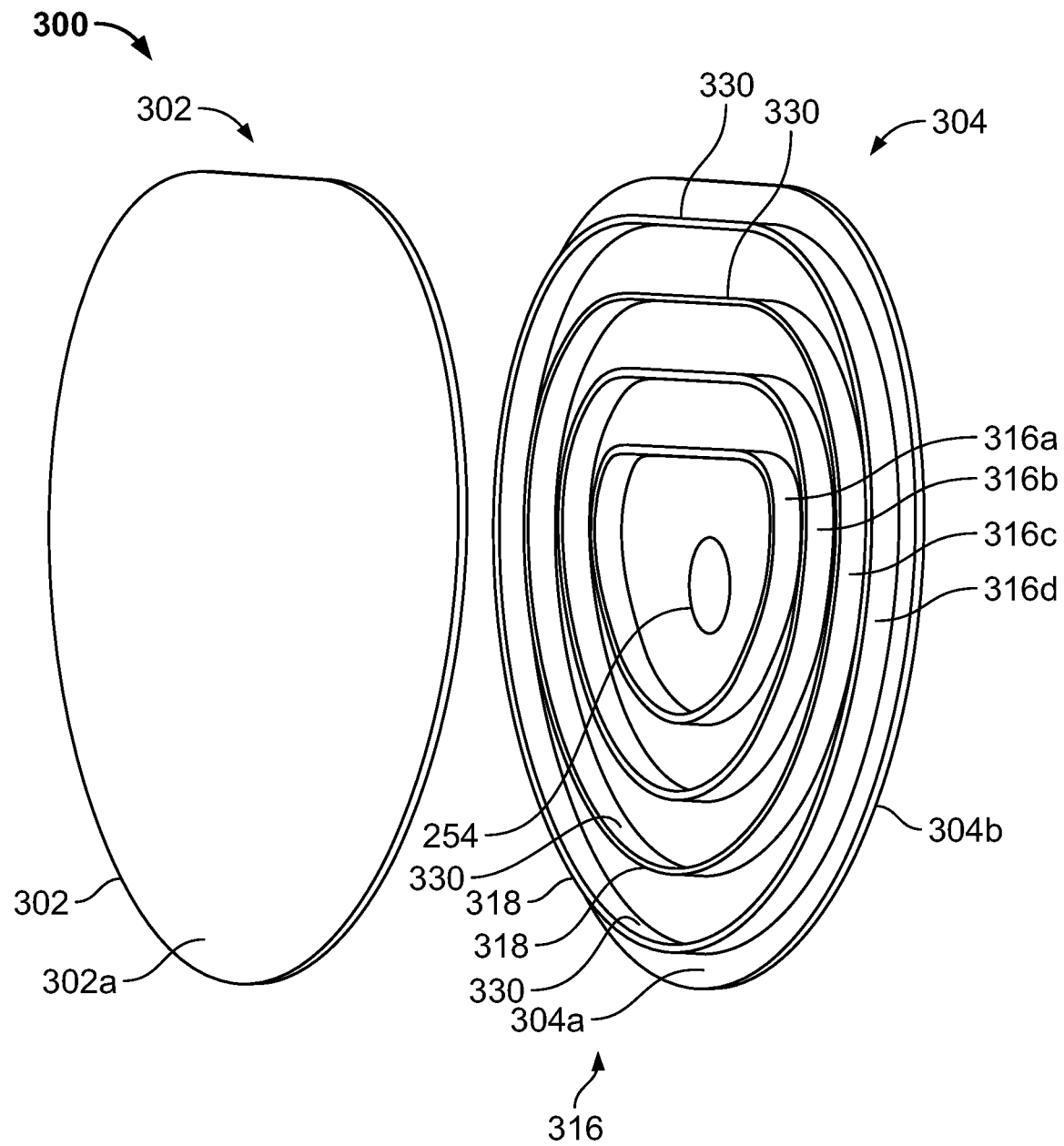
FIG. 8 is a front exploded view of the pressure attenuator of FIG. 7.
Figure 9:
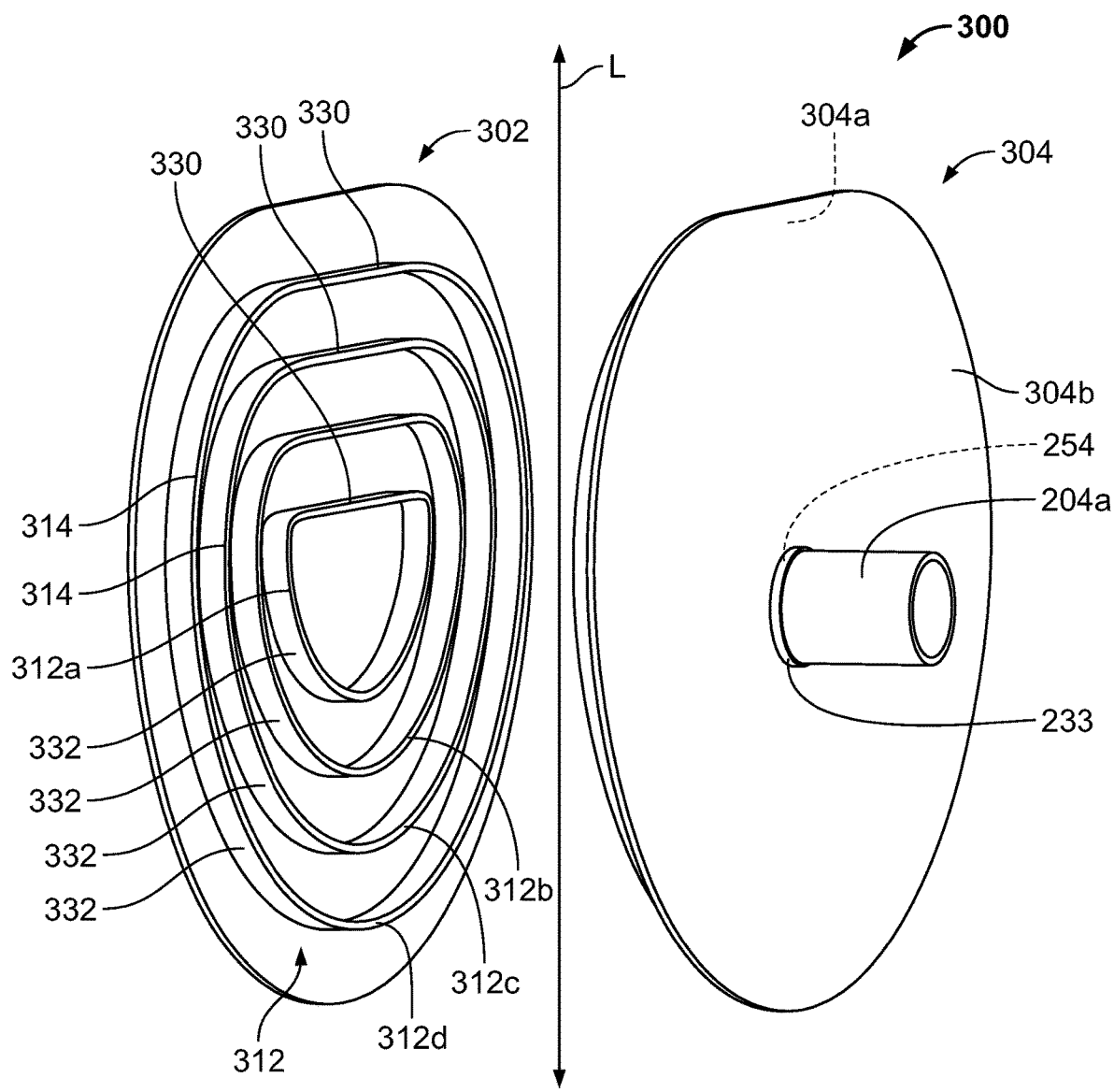
FIG. 9 is a rear exploded view of the pressure attenuator of FIG. 7.

In one example, the pressure attenuator 300 includes two spaced apart plates, a first plate 302 and an opposed second plate 304. In this example, with reference to FIG. 8, each of the first plate 302 and the second plate 304 are substantially D-shaped. With reference to FIG. 9, the first plate 302 includes at least a pair of nested protrusions, and in this example, the first plate 302 includes four first protrusions 312a-312d. The first protrusions 312a-312d are nested relative to each other about an axis A300 of the first plate 302 and the second plate 304 (FIG. 7), and are substantially evenly spaced along a first surface 302a of the first plate 302. It should be noted that the first protrusions 312a-312d may be arranged in other patterns on the first plate 302 and may not be evenly spaced. Each of the first protrusions 312a-312d extend axially from the first surface 302a of the first plate 302. The first surface 302a is opposite a second surface 302b. In this example, each of the first protrusions 312a-312d are planar or extend from the first surface 302a along an axis substantially parallel to the axis A300. In other examples, the first protrusions 312a-312d may extend from the first surface 302a at an angle so as to extend along an axis oblique to the axis A300. Each of the first protrusions 312a-312d have an end coupled to the first surface 302a, and an opposite end or terminal end 314. The terminal end 314 of each of the first protrusions 312a-312d is spaced apart from a third surface 304a of the second plate 304.

Figure 7:
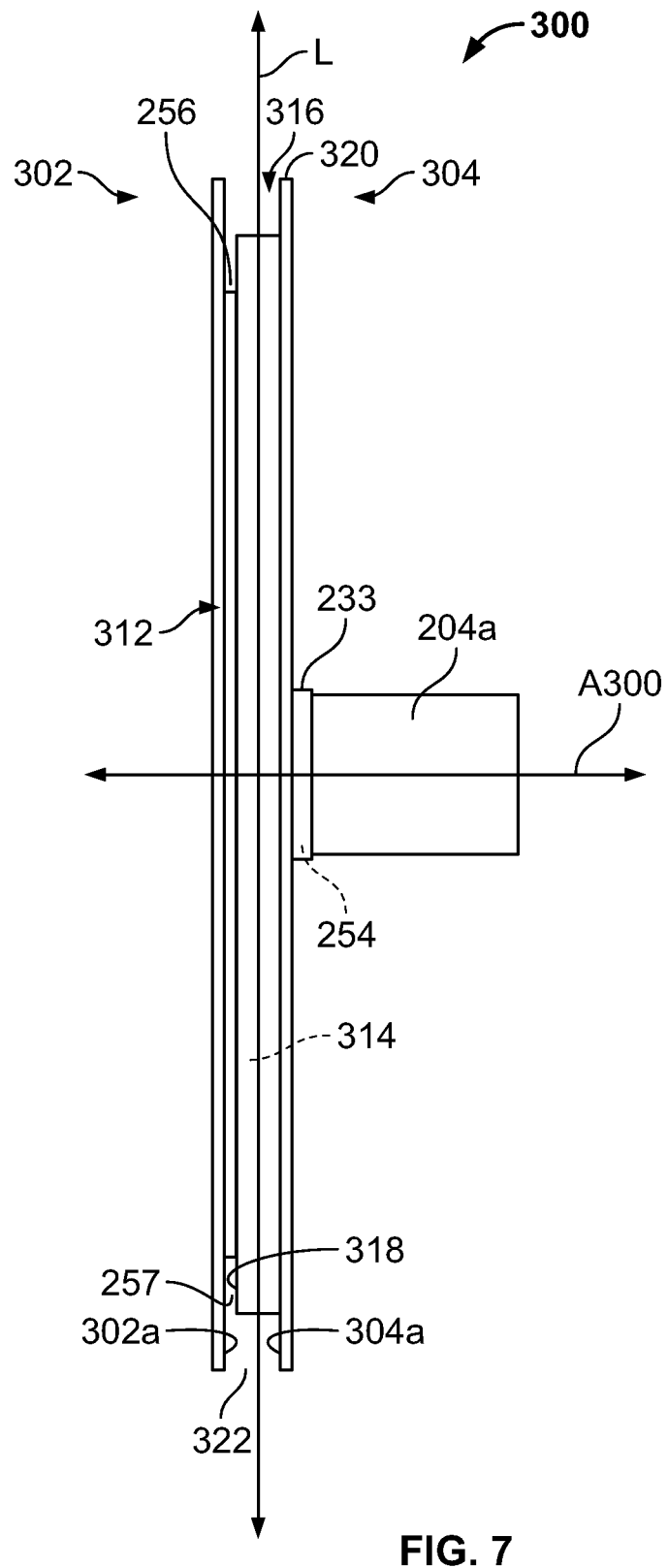
FIG. 7 is a side view of another exemplary pressure attenuator for use with the muffler of FIG. 1.

With reference back to FIG. 8, the second plate 304 includes at least a pair of nested protrusions, and in this example, the second plate 304 includes four second protrusions 316a-316d. The second protrusions 316a-316d are nested relative to each other about an axis A300 of the first plate 302 and the second plate 304, and are substantially evenly spaced along the third surface 304a of the second plate 304. It should be noted that the second protrusions 316a-316d may be arranged in other patterns on the second plate 304 and may not be evenly spaced. Each of the second protrusions 316a-316d extend axially from the third surface 304a of the second plate 304. The third surface 304a is opposite a fourth surface 304b. In this example, each of the second protrusions 316a-316d are planar or extend from the third surface 304a along an axis substantially parallel to the axis A300 (FIG. 7). In other examples, the second protrusions 316a-316d may extend from the third surface 304a at an angle so as to extend along an axis oblique to the axis A300. Each of the second protrusions 316a-316d have an end coupled to the third surface 304a, and an opposite end or terminal end 318. The terminal end 318 of each of the second protrusions 316a-316d is spaced apart from the first surface 302a of the first plate 302. In this example, the second plate 304 defines the bore 254 that forms an inlet of the pressure attenuator 300. With brief reference to FIG. 9, as discussed, the bore 254 is fluidly coupled to the header pipe 204. The annular flange 233 is defined about the bore 254 and extends outwardly from the fourth surface 304b of the second plate 304.

In this example, the first protrusions 312a-312d and the second protrusions 316a-316d have an arbitrary shape or a polygonal shape. With reference to FIGS. 8 and 9, each of the first protrusions 312a-312d and the second protrusions 316a-316d have a substantially D-shape or include a planar segment 330 and an arcuate segment 332 that cooperate to enclose a volume. The planar segment 330 extends substantially perpendicular to the longitudinal axis L. The volume enclosed by the planar segment 330 and the arcuate segment 332 is different or increases from the innermost first protrusion 312a and the innermost second protrusion 316a to the outermost first protrusion 312d and the outermost second protrusion 316d. It should be noted that the D-shape illustrated and described herein is merely just one example of a polygonal shape that may be employed to form one or more of the first protrusions 312a-312d and the second protrusions 316a-316d. Other examples include, but are not limited to stars, pentagons, lobed-shapes, daisy shapes, etc. In addition, it should be noted that a pressure attenuator may be formed in which protrusions having the shape of the first protrusions 312a-312d and/or the second protrusions 316a-316d alternate with the circular shape of the first protrusions 246a-246e and the second protrusions 250a-250e. Moreover, it should be noted that a plate of a pressure attenuator may be formed in which a protrusion having the shape of the first protrusions 246a-246e and/or the first protrusions 312a-312d is mixed with protrusions having a polygonal shape. For example, a plate of a pressure attenuator may be formed such that each protrusion of the plate has a unique polygonal shape.

In this example, the first protrusions 312a-312d face the second protrusions 316a-316d and are offset or misaligned from the second protrusions 316a-316d along the longitudinal axis L. With reference to FIG. 7, by spacing the terminal end 314, 318 of the first protrusions 312a-312d and the second protrusions 316a-316d, respectively, from the corresponding one of the first surface 302a and the third surface 304a and misaligning the first protrusions 312a-312d from the second protrusions 316a-316d, the undulating tortuous path 256 for the exhaust gases 108 (FIG. 1) is defined between the first protrusions 312a-312d and the second protrusions 316a-316d along the longitudinal axis L. The tortuous path 256 extends radially from the inlet defined by the bore 254 to an outer perimeter or circumference 320 of the first plate 302. The outer circumference 320 of the first plate 302 defines an outlet 322 about the outer circumference 320 for the exhaust gases 108 to enter into the forward chamber 208 (FIG. 3). The tortuous path 256 results in pressure loss for the exhaust gases 108 (FIG. 1), which has to make sharp turns to pass between gaps 257 defined between the respective terminal end 314, 318 and the respective first surface 302a and third surface 304a.

It should be noted that while the terminal end 314, 318 is illustrated herein as being smooth, the terminal end 314, 318 of one or more of the first protrusions 312a-312d and the second protrusions 316a-316d may be serrated, scalloped, or have a different shape. The first plate 302 and the second plate 304 are each composed of metal or metal alloy, and may be stamped, cast, machined, additively manufactured, etc. The first plate 302 and the second plate 304 may be stamped with grooves for the first protrusions 312a-312d and the second protrusions 316a-316d, respectively, and the first protrusions 312a-312d and the second protrusions 316a-316d may be separately formed, via stamping, for example, and fixedly coupled to the grooves of the respective first plate 302 and the second plate 304 via welding or brazing, for example. Optionally, one or more pins may be employed to couple the first plate 302 to the second plate 304 to maintain the gap 257 between the first plate 302 and the second plate 304.

It should be noted that in other embodiments, the first plate 240 and the second plate 242 of the pressure attenuator 206 for the muffler 200 may be configured differently to define the tortuous path 256 to reduce pressure and velocity of incoming airflow. For example, with reference to FIG. 10, a front view of a first plate 400 is shown and in FIG. 11, a front view of a second plate 402 is shown. As the first plate 400 and the second plate 402 include components that are the same or similar to components of the first plate 240 and the second plate 242 of the pressure attenuator 206 discussed with regard to FIGS. 1-6, the same reference numerals will be used to denote the same or similar components. The first plate 400 and the second plate 402 extend radially within the housing 202. It should be noted that the housing 202 may be modified, if desired, to accommodate the shape of the first plate 400 and the second plate 402.

Figure 10:
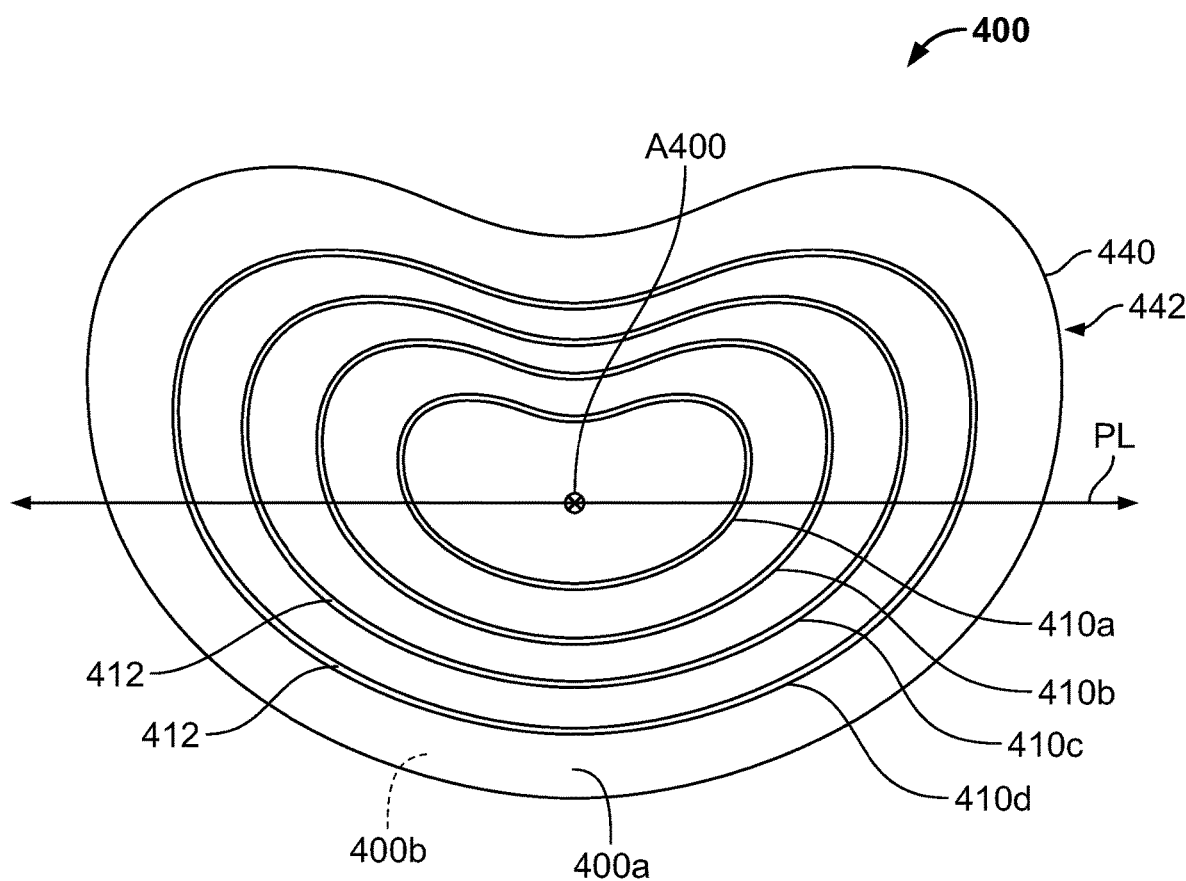
FIG. 10 is a front view of an exemplary first plate for a pressure attenuator for use with the muffler of FIG. 1.

In one example, the first plate 400 is opposite the second plate 402 to define a pressure attenuator. In this example, each of the first plate 400 and the second plate 402 are substantially kidney-shaped, and extend along a plate longitudinal axis PL. With reference to FIG. 10, the first plate 400 includes at least a pair of nested protrusions, and in this example, the first plate 400 includes four first protrusions 410a-410d. The first protrusions 410a-410d are nested relative to each other about an axis A400 of the first plate 400 and the second plate 402 (FIG. 11), and are substantially evenly spaced along a first surface 400a of the first plate 400. It should be noted that the first protrusions 410a-410d may be arranged in other patterns on the first plate 400 and may not be evenly spaced. Each of the first protrusions 410a-410d extend axially from the first surface 400a of the first plate 400. The first surface 400a is opposite a second surface 400b. In this example, each of the first protrusions 410a-410d are planar or extend from the first surface 400a along an axis substantially parallel to the axis A400. In other examples, the first protrusions 410a-410d may extend from the first surface 400a at an angle so as to extend along an axis oblique to the axis A400. Each of the first protrusions 410a-410d have an end coupled to the first surface 400a, and an opposite end or terminal end 412. When assembled opposite the second plate 402, the terminal end 412 of each of the first protrusions 410a-410d is spaced apart from a third surface 402a of the second plate 402 (FIG. 11).

Figure 11:
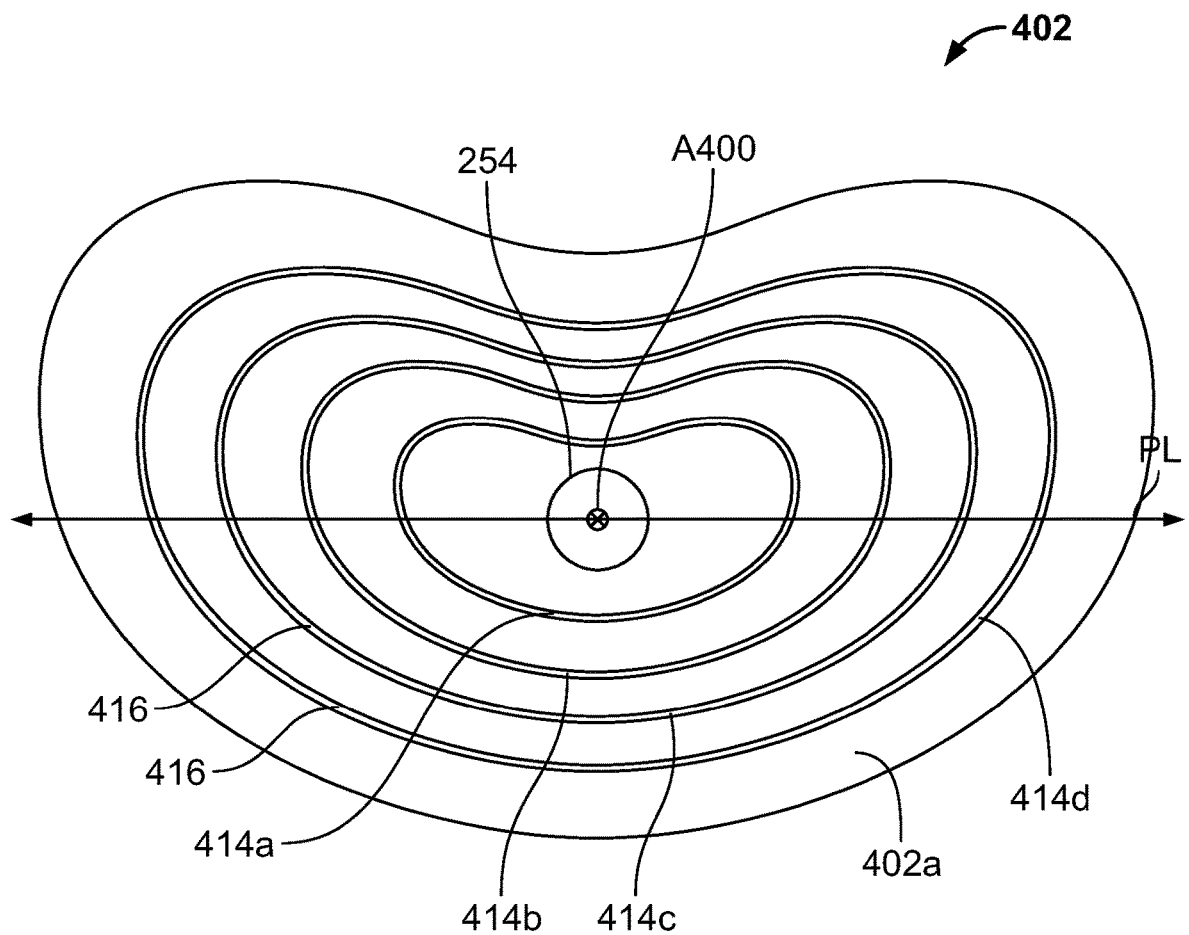
FIG. 11 is a front view of an exemplary second plate for a pressure attenuator for use with the muffler of FIG. 1.

With reference to FIG. 11, the second plate 402 includes at least a pair of nested protrusions, and in this example, the second plate 402 includes four second protrusions 414a-414d. The second protrusions 414a-414d are nested relative to each other about an axis A400 of the first plate 400 and the second plate 402, and are substantially evenly spaced along the third surface 402a of the second plate 402. It should be noted that the second protrusions 414a-414d may be arranged in other patterns on the second plate 402 and may not be evenly spaced. Each of the second protrusions 414a-414d extend axially from the third surface 402a of the second plate 402. The third surface 402a is opposite a fourth surface 402b. In this example, each of the second protrusions 414a-414d are planar or extend from the third surface 402a along an axis substantially parallel to the axis A400. In other examples, the second protrusions 414a-414d may extend from the third surface 402a at an angle so as to extend along an axis oblique to the axis A400. Each of the second protrusions 414a-414d have an end coupled to the third surface 402a, and an opposite end or terminal end 416. When assembled opposite the first plate 400, the terminal end 416 of each of the second protrusions 414a-414d is spaced apart from the first surface 400a of the first plate 400 (FIG. 10). In this example, the second plate 402 defines the bore 254 that forms an inlet of the pressure attenuator. The second plate 402 may also include the annular flange 233 defined about the bore 254 and extending outwardly from the fourth surface 402b of the second plate 402.

In this example, the first protrusions 410a-410d and the second protrusions 414a-414d have an arbitrary shape or a polygonal shape. With reference to FIGS. 10 and 11, each of the first protrusions 410a-410d and the second protrusions 414a-414d have a substantially kidney shape that encloses the volume. The volume enclosed by each of the first protrusions 410a-410d and the second protrusions 414a-414d is different or increases from the innermost first protrusion 410a and the innermost second protrusion 414a to the outermost first protrusion 410d and the outermost second protrusion 414d. It should be noted that the kidney shape illustrated and described herein is merely just one example of a polygonal shape that may be employed to form one or more of the first protrusions 410a-410d and the second protrusions 414a-414d. Other examples include, but are not limited to stars, pentagons, lobed-shapes, daisy shapes, etc. In addition, the first protrusions 410a-410d and the second protrusions 414a-414d may comprise circles or ovals.

In this example, the first protrusions 410a-410d face the second protrusions 414a-414d and are offset or misaligned from the second protrusions 414a-414d so as to define the undulating tortuous path 256 between the first plate 400 and the second plate 402 when assembled. The tortuous path 256 extends radially from the inlet defined by the bore 254 (FIG. 10) to an outer perimeter or circumference 440 of the first plate 400 (FIG. 11). The outer circumference 440 of the first plate 400 defines an outlet 442 about the outer circumference 440 for the exhaust gases 108 to enter into the forward chamber 208 (FIG. 3). The tortuous path 256 results in pressure loss for the exhaust gases 108 (FIG. 1), which has to make sharp turns to pass between gaps 257 defined between the respective terminal end 412, 416 and the respective first surface 400a and third surface 402a when the first plate 400 is coupled to the second plate 402.

It should be noted that while the terminal end 412, 416 is illustrated herein as being smooth, the terminal end 412, 416 of one or more of the first protrusions 410a-410d and the second protrusions 414a-414d may be serrated, scalloped, or have a different shape. The first plate 400 and the second plate 402 are each composed of metal or metal alloy, and may be stamped, cast, machined, additively manufactured, etc. The first plate 400 and the second plate 402 may be stamped with grooves for the first protrusions 410a-410d and the second protrusions 414a-414d, respectively, and the first protrusions 410a-410d and the second protrusions 414a-414d may be separately formed, via stamping, for example, and fixedly coupled to the grooves of the respective first plate 400 and the second plate 402 via welding or brazing, for example. Optionally, one or more pins may be employed to couple the first plate 400 to the second plate 402 to maintain the gap 257 between the first plate 400 and the second plate 402.

Figure 5:
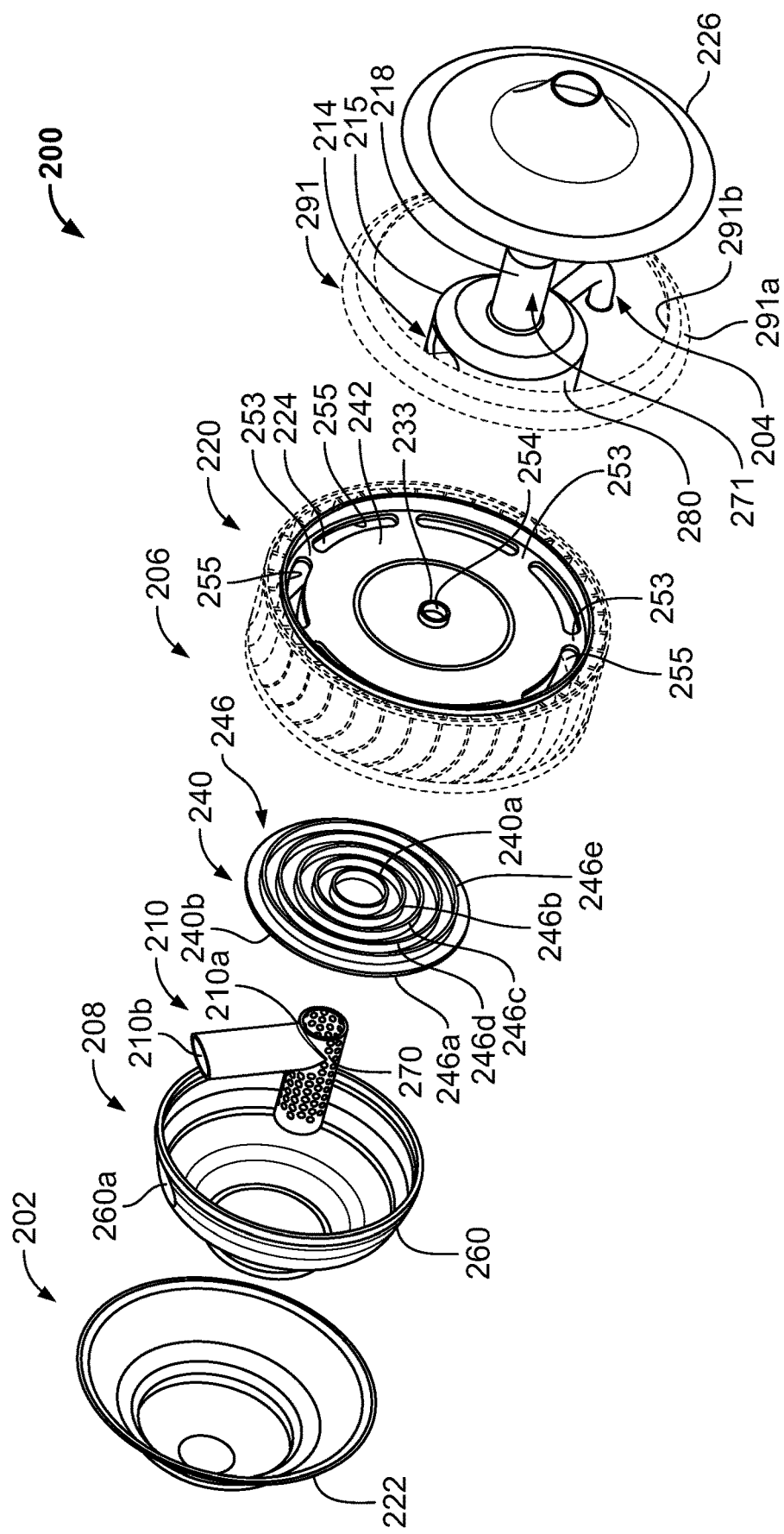
FIG. 5 is a rear exploded view of the muffler.

With reference back to FIG. 3, the forward chamber 208 is substantially frustoconical, however, the forward chamber 208 may have any polygonal shape, including, but not limited to cylindrical, hemispherical, etc. The forward chamber 208 is downstream from the pressure attenuator 206 and is fluidly coupled to the outlet 262. The forward chamber 208 includes the chamber wall 260, which extends from the outlet 262 to proximate the first housing wall 222. In this example, the chamber wall 260 is spaced apart from the first housing wall 222 to define the outer chamber 212 between the chamber wall 260 and the first housing wall 222. The chamber wall 260 is substantially hemispherical, but the chamber wall 260 may have any polygonal shape, including, but not limited to cylindrical, frustoconical, etc. (FIGS. 5 and 6). The chamber wall 260 may be one-piece, and may be composed of metal or metal alloy and stamped, cast, machined etc. to define the forward chamber 208. The chamber wall 260 also defines a chamber bore 260a. The chamber bore 260a receives the first transfer tube 210 to enable the first transfer tube 210 to direct the exhaust gases 108 out of the forward chamber 208.

The forward chamber 208 also includes and is fluidly coupled to a perforated tube 270. The perforated tube 270 is composed of a metal or metal alloy, and is stamped, cast, machined, additively manufactured, etc. The perforated tube 270 is cylindrical and coaxial with the central axis C. Thus, the perforated tube 270 extends along an axis, which is coaxial with the central axis C and substantially perpendicular to the longitudinal axis L. The perforated tube 270 is coupled to the second surface 240b of the first plate 240 at a first tube end 270a and extends from the first plate 240 to the chamber wall 260 where a second tube end 270b is coupled to the chamber wall 260. The perforated tube 270 defines a plurality of holes or perforations 272, which are spaced apart about a perimeter or circumference of the perforated tube 270 from the first tube end 270a to proximate the second tube end 270b. The perforations 272 enable the exhaust gases 108 from the forward chamber 208 to flow into the perforated tube 270. The perforated tube 270 is fluidly and physically coupled to the first transfer tube 210.

The first transfer tube 210 is fluidly coupled between the forward chamber 208 and the outer chamber 212. The first transfer tube 210 is composed of metal or metal alloy, and is stamped, cast, machined, additively manufactured, etc. The first transfer tube 210 is cylindrical, and has a solid outer wall. The first transfer tube 210 is fixedly coupled to the perforated tube 270 via welding, for example, and is coupled to the chamber wall 260. The first transfer tube 210 has a first transfer inlet 210a defined at the perforated tube 270, and a first transfer outlet 210b defined at the chamber wall 260 (FIG. 6). The first transfer tube 210 extends radially, along an axis substantially parallel to the longitudinal axis L, and substantially perpendicular to the central axis C. The first transfer tube 210 directs the exhaust gases 108 from the forward chamber 208 to the outer chamber 212.

The outer chamber 212 is defined between the chamber wall 260 and the first housing wall 222, and between the outer circumference 258 of the pressure attenuator 206 and the second housing wall 224. Thus, the outer chamber 212 is defined by a portion of the housing 202 exterior to the pressure attenuator 206 and the forward chamber 208. Stated another way, the outer chamber 212 is radially and axially outboard of the forward chamber 208 and the pressure attenuator 206. The outer chamber 212 is defined to extend about or circumscribe the first plate 240 and the second plate 242, but is fluidly isolated from the pressure attenuator 206. In one example, a volume of the outer chamber 212 is different, and less than, a volume of the forward chamber 208. It should be noted that the outer chamber 212, however, may have any desired volume that may be greater or less than the volume of the forward chamber 208 to target predetermined frequencies. The forward chamber 208 and the outer chamber 212 are each generally an expansion chamber. The dimensions of the outer chamber 212 may be tuned to frequencies that are not treated by the forward chamber 208 or the aft chamber 216. The outer chamber 212 is fluidly coupled to the first transfer tube 210 and the second transfer tube 214. The first transfer tube 210 directs the exhaust gases 108 into the outer chamber 212, while the second transfer tube 214 directs the exhaust gases 108 into the aft chamber 216.

Figure 12:
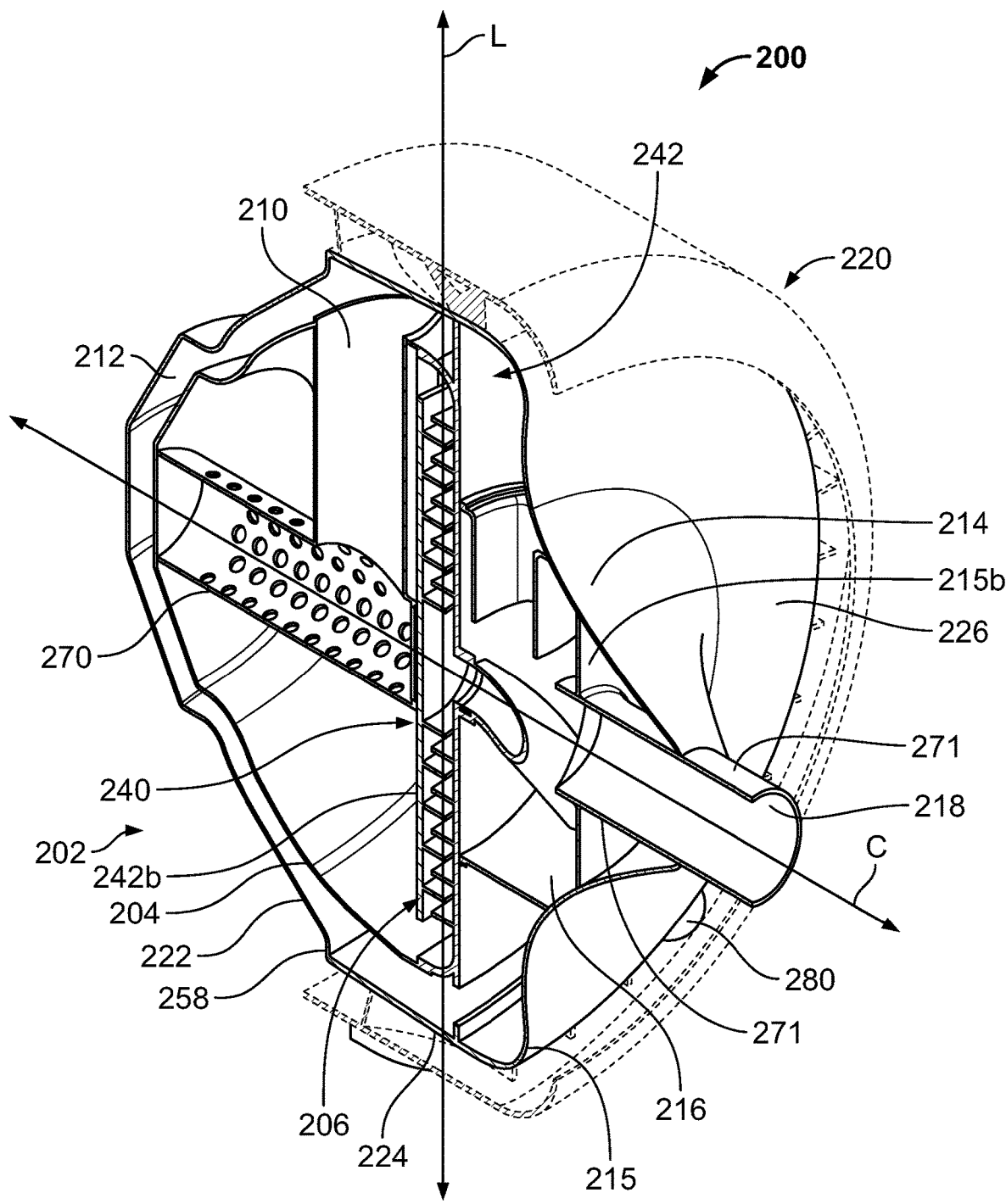
FIG. 12 is an aft elevation cross-sectional view of the muffler taken along line 3-3 of FIG. 2.

The second transfer tube 214 is fluidly coupled between the outer chamber 212 and the aft chamber 216. The second transfer tube 214 is substantially cylindrical, and has a racetrack or oval cross-section. The second transfer tube 214 has a solid outer wall. In one example, with reference to FIG. 6, the second transfer tube 214 is defined in the sub-housing 215. The sub-housing 215 is composed of metal or metal alloy, and is stamped, cast, machined, additively manufactured, etc. The sub-housing 215 is generally annular, and includes a first end 215a opposite a second end 215b. The first end 215a is circumferentially open, and is enclosed by the fourth surface 242b of the second plate 242 (FIG. 12). The sub-housing 215 cooperates with the second plate 242 to fluidly isolate the aft chamber 216 from the outer chamber 212. The second transfer tube 214 is defined radially inward toward a center of the sub-housing 215, but is spaced apart from the header pipe 204. The second end 215b of the sub-housing 215 may be conical such that the sub-housing 215 tapers from the second transfer tube 214 along the second end 215b (FIG. 12). The second end 215b is substantially circumferentially enclosed, and defines a bore 271. With reference to FIG. 12, the bore 271 receives the exhaust pipe 218 to couple the exhaust pipe 218 to the muffler 200. The sub-housing 215 is fixedly coupled to the third housing wall 226 via brazing or welding, for example, and the sub-housing 215 is coupled to the fourth surface 242b of the second plate 242 via brazing or welding, for example. The second transfer tube 214 extends radially, along an axis substantially parallel to the longitudinal axis L, and substantially perpendicular to the central axis C. The second transfer tube 214 directs the exhaust gases 108 from the outer chamber 212 to the aft chamber 216 defined within the sub-housing 215.

The aft chamber 216 is defined within the sub-housing 215 between the second transfer tube 214 and the exhaust pipe 218. With continued reference to FIG. 12, the sub-housing 215 includes an aft chamber wall 280, which is coupled to the fourth surface 242b of the second plate 242 and the third housing wall 226. Thus, the aft chamber 216 is defined between the second plate 242 and the third housing wall 226, and is fluidly isolated from the pressure attenuator 206. The aft chamber 216 is fluidly coupled to the second transfer tube 214 to receive the exhaust gases 108 from the outer chamber 212, and is fluidly coupled to the exhaust pipe 218.

The exhaust pipe 218 is fluidly coupled to the aft chamber 216 and extends beyond the housing 202 of the muffler 200 to direct the exhaust gases 108 from the muffler 200. The exhaust pipe 218 is composed of metal or metal alloy, and is stamped, cast, machined, additively manufactured, etc. The exhaust pipe 218 is cylindrical, and is solid. The exhaust pipe 218 is fixedly coupled to the bore 271 of the sub-housing 215 via brazing or welding, for example, and is coupled to the exhaust bore 232 of the third housing wall 226 via brazing or welding, for example. The exhaust pipe 218 extends axially, along an axis substantially perpendicular to the longitudinal axis L, and substantially parallel to the central axis C. The exhaust pipe 218 directs the exhaust gases 108 from the muffler 200, and in one example, directs the exhaust gases 108 to an ambient environment surrounding the engine 102 (FIG. 1). Alternatively, the exhaust pipe 218 may be fluidly coupled to a downstream secondary muffler.

With reference back to FIG. 3, in one example, the deswirl assembly 220 is defined about the second housing wall 224. It should be noted that in certain embodiments, the muffler 200 need not include the deswirl assembly 220 and the deswirl assembly 220 may be optional. The deswirl assembly 220 includes an outer assembly wall 290 and at least one or a plurality of vanes 294. The deswirl assembly 220 is composed of metal or metal alloy, and is cast, machined, forged, additively manufactured, etc. The outer assembly wall 290 is annular, and is concentric with the second housing wall 224. The outer assembly wall 290 extends about the perimeter of the second housing wall 224, and is spaced apart from the second housing wall 224 to define an airflow path 296. The outer assembly wall 290 has a first wall end 290a and a second wall end 290b. The first wall end 290a is upstream from the second wall end 290b, and receives the cooling air 110 (FIG. 1) from the cooling fan 116. The outer assembly wall 290 is substantially planar from the first wall end 290a to proximate the second wall end 290b. The second wall end 290b is coupled to a guide flange 291. The guide flange 291 is annular (FIG. 5), and curves radially inward from a first flange end 291a to a second flange end 291b. The curvature of the guide flange 291 directs the cooling air 110 along an exterior surface of the third housing wall 226. The guide flange 291 is composed of metal or metal alloy, and is cast, stamped, machined, additively manufactured, etc. The guide flange 291 is coupled to the second wall end 290b via welding or brazing, for example, however, other techniques may be employed. For example, the guide flange 291 may be integrally formed with the outer assembly wall 290.

The vanes 294 are spaced apart about the perimeter of the second housing wall 224 and coupled between the second housing wall 224 and the outer assembly wall 290. The vanes 294 are coupled to the second housing wall 224, via brazing or welding, for example, and are coupled to the outer assembly wall 290 via brazing or welding, for example, or may be integrally formed with the outer assembly wall 290. The vanes 294 extend along an axis substantially parallel to the centerline C and substantially perpendicular to the longitudinal axis L, however, in other embodiments, the vanes 294 may be orientated differently. With reference to FIG. 4, each of the vanes 294 has a leading end 294a and an opposite trailing end 294b along the airflow path 296. The leading end 294a is proximate the first wall end 290a, and the trailing end 294b is proximate the second wall end 290b. The vanes 294 remove tangential velocity from the cooling air 110 as it flows through the deswirl assembly 220 along the airflow path 296.

In one example, with reference to FIG. 3, with the first protrusions 246a-246e coupled to the first plate 240, the second protrusions 250a-250e coupled to the second plate 242 and the second housing wall 224 formed, the first plate 240 is spaced apart from the second plate 242 coupled to the second housing wall 224 to define the gap 257 (FIG. 4). Alternatively, with the first protrusions 312a-312d coupled to the first plate 302, the second protrusions 316a-316d coupled to the second plate 304 and the second housing wall 224 formed, the first plate 302 is spaced apart from the second plate 304 coupled to the second housing wall 224 to define the gap 257 (FIGS. 7-9). As a further alternative, with the first protrusions 410a-410d coupled to the first plate 400, the second protrusions 414a-414d coupled to the second plate 402 and the second housing wall 224 formed, the first plate 400 is spaced apart from the second plate 402 coupled to the second housing wall 224 to define the gap 257 (FIGS. 10 and 11). The header pipe 204 is positioned through the sub-housing 215 and coupled to the second plate 242. With the chamber wall 260, the perforated tube 270 and the first transfer tube 210 formed, the perforated tube 270 is coupled to the first transfer tube 210, via welding, brazing, etc. The chamber wall 260 is positioned about the perforated tube 270 and the first transfer tube 210 is inserted through the chamber bore 260a of the chamber wall 260. The chamber wall 260 is coupled to the second plate 242 via welding, brazing, etc. The first housing wall 222 is coupled to the second housing wall 224 via welding, brazing, etc. to form a seal. With the second transfer tube 214 defined in the sub-housing 215, the sub-housing 215 is coupled to the second plate 242 via welding, brazing, etc. to form a seal. The third housing wall 226 is coupled to the sub-housing 215 via welding, brazing, etc. to form a seal. The vanes 294 of the deswirl assembly 220 are coupled to the second housing wall 224, and the outer assembly wall 290 is coupled to the vanes 294. The guide flange 291 is coupled to the outer assembly wall 290 via welding, brazing, etc.

With the muffler 200 assembled, the muffler 200 is fluidly coupled to the engine 102 (FIG. 1). In one example, the header pipe 204 is fluidly coupled to an exhaust manifold associated with the engine 102 (FIG. 1) to receive the exhaust gases 108. The deswirl assembly 220 is placed in fluid communication with the cooling fan 116 to receive the cooling air 110 (FIG. 1). During operation of the engine 102, such as the Wankel engine, the exhaust gases 108 have high energy. The exhaust gases 108 flow from the engine 102 through the header pipe 204 into the pressure attenuator 206. The exhaust gases 108 flow radially through the tortuous path 256 and exit the pressure attenuator 206 at the outer circumference 258 of the first plate 240 into the forward chamber 208. It should be noted that the gap 257 may be adjusted (increased or decreased) by moving the first plate 240 and/or the second plate 242 if desired based on the operating characteristics of the engine 102 (FIG. 1). The exhaust gases 108 expand in the forward chamber 208, and flow into the perforated tube 270. The exhaust gases 108 flow from the perforated tube 270 into the first transfer tube 210. The first transfer tube 210 directs the exhaust gases 108 into the outer chamber 212. From the outer chamber 212, the exhaust gases 108 flow through the second transfer tube 214 to the aft chamber 216. From the aft chamber 216, the exhaust gases 108 flow into the exhaust pipe 218 where the exhaust gases 108 are directed external to the muffler 200. The cooling air 110 received by the deswirl assembly 220 provides cooling to the muffler 200 during the operation of the engine 102 (FIG. 1).

Thus, the muffler 200 receives the high-energy exhaust gases 108 from the engine 102 (FIG. 1) and reduces the pressure of the exhaust gases without generating excessive velocity with the pressure attenuator 206, which limits noise generation. The forward chamber 208 and the outer chamber 212 cooperate as expansion chambers to attenuate the sound generated by the exhaust gases. The compact size of the muffler 200 enables the muffler 200 to be used within the power unit 104 and the muffler 200 may be positioned within the housing 120 of the power unit 104. In addition, the integration of the deswirl assembly 220 with the muffler 200 reduces components associated with the power unit 104. It should be noted that while the pressure attenuator 206 is described herein as circular having the first plate 240 and second plate 242 with a circular shape, the pressure attenuator 300 is described herein as D-shaped having the first plate 302 and second plate 304 with the D-shape; the pressure attenuator having the first plate 400 and the second plate 402 having the kidney shape, a pressure attenuator and the associated plates for use with the muffler 200 may have any desired shape, including, but not limited to, kidney shaped, D-shaped, circular, oval, polygonal, etc. Thus, the shapes of the plates 240, 242, 302, 304, 400, 402 is merely an example. Moreover, as discussed, the shapes of the first protrusions 246a-246e, the second protrusions 250a-250e, the first protrusions 312a-312d, the second protrusions 316a-316d, the first protrusions 410a-410d and the second protrusions 414a-414d are merely an example, as the first protrusions 246a-246e, the second protrusions 250a-250e, the first protrusions 312a-312d, the second protrusions 316a-316d, the first protrusions 410a-410d and the second protrusions 414a-414d may have any polygonal shape. Moreover, each of the plates 240, 242, 302, 304, 400, 402 may have any number of the first protrusions 246, the second protrusions 250, the first protrusions 312, the second protrusions 316, the first protrusions 410 and the second protrusions 414 and the shape of the first protrusions 246, the second protrusions 250, the first protrusions 312, the second protrusions 316, the first protrusions 410 and the second protrusions 414 may vary along the respective plate 240, 242, 302, 304, 400, 402 such that the first protrusions 246, the second protrusions 250, the first protrusions 312, the second protrusions 316, the first protrusions 410 and the second protrusions 414a associated with the particular plate 240, 242, 302, 304, 400, 402 need not have the same shape.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A muffler, comprising:
   a housing defining a first chamber, a second chamber and a third chamber, the first chamber positioned opposite the third chamber within the housing, the housing configured to be fluidly coupled to a source of exhaust gases via an inlet;
   at least a pair of nested protrusions in communication with the inlet and configured to receive the exhaust gases, the pair of nested protrusions coupled to a respective surface of a pair of plates disposed in the housing such that one of the pair of nested protrusions is spaced apart from and opposite another of the pair of nested protrusions to define a tortuous path for the exhaust gases that terminates at an outlet defined along an outer circumference of one of the pair of plates, the first chamber downstream from the pair of plates and in fluid communication with the outlet, the second chamber is disposed about the pair of plates proximate the outlet and fluidly isolated from the outlet;
   a first tube fluidly coupled between the first chamber and the second chamber configured to direct the exhaust gases from the first chamber to the second chamber; and
   a second tube fluidly coupled between the second chamber and the third chamber configured to direct the exhaust gases from the second chamber to the third chamber.

2. The muffler of claim 1, wherein the first chamber includes a perforated tube disposed axially within the first chamber.

3. The muffler of claim 2, wherein the perforated tube is fluidly coupled to the first tube and configured to direct the exhaust gases from the first chamber to the first tube.

4. The muffler of claim 2, wherein the muffler has a longitudinal axis, the pair of plates extend along the longitudinal axis, the first tube extends along an axis substantially parallel to the longitudinal axis and the perforated tube extends along a centerline substantially perpendicular to the longitudinal axis.

5. The muffler of claim 1, further comprising a third tube disposed in the third chamber and configured to direct the exhaust gases from the third chamber to exit the muffler.

6. The muffler of claim 1, wherein the pair of nested protrusions have a polygonal shape.

7. The muffler of claim 1, wherein the source of exhaust gases is a header pipe associated with an engine of a power unit.

8. The muffler of claim 1, wherein the pair of plates includes a first plate opposite and spaced apart from a second plate, the first plate including a first surface opposite a second surface, the second plate including a third surface opposite a fourth surface, and the pair of nested protrusions include a first pair of nested protrusions defined on the first surface of the first plate and a second pair of nested protrusions defined on the third surface of the second plate, the first pair of nested protrusions facing the second pair of nested protrusions to define the tortuous path.

9. The muffler of claim 8, wherein the first pair of nested protrusions is offset from the second pair of nested protrusions to define the tortuous path.

10. The muffler of claim 1, wherein the pair of nested protrusions comprise concentric circular protrusions.

11. The muffler of claim 1, wherein the second tube is defined in a sub-housing, and the sub-housing is coupled to one of the pair of plates.

12. A muffler, comprising:
    a housing defining a first chamber, a second chamber and a third chamber, the first chamber positioned opposite the third chamber within the housing, the housing configured to be fluidly coupled to a source of exhaust gases via an inlet;
    at least a pair of nested protrusions in communication with the inlet and configured to receive the exhaust gases, the pair of nested protrusions coupled to a respective surface of a pair of plates disposed in the housing such that one of the pair of nested protrusions is spaced apart from and opposite another of the pair of nested protrusions to define a tortuous path for the exhaust gases that terminates at an outlet defined along an outer circumference of one of the pair of plates, the first chamber downstream from the pair of plates and in fluid communication with the outlet;
    a first tube fluidly coupled between the first chamber and the second chamber configured to direct the exhaust gases from the first chamber to the second chamber;
    a second tube fluidly coupled between the second chamber and the third chamber configured to direct the exhaust gases from the second chamber to the third chamber; and
    a deswirl assembly coupled about a perimeter of the housing.

13. The muffler of claim 12, wherein the housing further comprises a first housing wall, a second housing wall coupled to the first housing wall and a third housing wall, the deswirl assembly coupled to the second housing wall, and the second chamber is defined between the first housing wall, the second housing wall and the first chamber.

14. The muffler of claim 13, wherein the third chamber is defined between one of the pair of plates and the third housing wall.

15. A muffler for an engine, comprising:
    a housing defining a first chamber, a second chamber and a third chamber, the first chamber positioned opposite the third chamber within the housing, the second chamber radially outboard of the first chamber, the housing configured to be fluidly coupled to the engine and configured to receive exhaust gases from the engine via an inlet;
    a pressure attenuator including a first plate and a second plate in communication with the inlet and configured to receive the exhaust gases, the first plate and the second plate cooperate to define a tortuous path that extends radially from the inlet, the first plate including a first pair of nested protrusions offset from a second pair of nested protrusions of the second plate, the pressure attenuator upstream from the first chamber and the first chamber fluidly coupled to the pressure attenuator via an outlet defined at an outer perimeter of the first plate;

a first tube fluidly coupled between the first chamber and the second chamber configured to direct the exhaust gases from the first chamber to the second chamber; and a second tube fluidly coupled between the second chamber and the third chamber configured to direct the exhaust gases from the second chamber to the third chamber.

16. The muffler of claim 15, wherein the first chamber includes a perforated tube disposed axially within the first chamber and the perforated tube is fluidly coupled to the first tube and configured to direct the exhaust gases from the first chamber to the first tube.

17. The muffler of claim 16, wherein the muffler has a longitudinal axis, the first plate and the second plate extend along the longitudinal axis, the first tube extends along an axis substantially parallel to the longitudinal axis and the perforated tube extends along a centerline substantially perpendicular to the longitudinal axis.

18. The muffler of claim 15, further comprising a deswirl assembly coupled about a perimeter of the housing and wherein the housing further comprises a first housing wall, a second housing wall coupled to the first housing wall and a third housing wall, the deswirl assembly coupled to the second housing wall, and the second chamber is defined between the first housing wall, the second housing wall and the first chamber.

19. The muffler of claim 15, further comprising a third tube disposed in the third chamber and configured to direct the exhaust gases from the third chamber to exit the muffler.

* * * * *